US010491826B2

(12) United States Patent
Kim et al.

(10) Patent No.: US 10,491,826 B2
(45) Date of Patent: Nov. 26, 2019

(54) METHOD FOR OBTAINING PANNING SHOT IMAGE AND ELECTRONIC DEVICE SUPPORTING THE SAME

(71) Applicant: Samsung Electronics Co., Ltd., Suwon-si, Gyeonggi-do (KR)

(72) Inventors: Ji Young Kim, Suwon-si (KR); Dong Eui Shin, Anyang-si (KR); Jae Hyoung Park, Yongin-si (KR); Jeong Won Lee, Seongnam-si (KR); Byung Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 15/791,976

(22) Filed: Oct. 24, 2017

(65) Prior Publication Data

US 2018/0176470 A1    Jun. 21, 2018

(30) Foreign Application Priority Data

Dec. 16, 2016   (KR) ........................ 10-2016-0172772

(51) Int. Cl.
*H04N 5/232* (2006.01)
*H04N 5/235* (2006.01)
(Continued)

(52) U.S. Cl.
CPC ........... *H04N 5/23287* (2013.01); *G03B 5/02* (2013.01); *G03B 15/16* (2013.01); *H04N 5/2258* (2013.01);
(Continued)

(58) Field of Classification Search
CPC ............ H04N 5/23287; H04N 5/2259; H04N 5/23254; H04N 5/23258; H04N 5/2353;
(Continued)

(56) References Cited

U.S. PATENT DOCUMENTS 7,877,004 B2    1/2011   Maruyama et al.
8,031,229 B2   10/2011   Mori
(Continued)

FOREIGN PATENT DOCUMENTS

JP    2006-246354 A    9/2006
JP    2010-193324 A    9/2010
KR    10-2009-0093817 A    9/2009

OTHER PUBLICATIONS

JP 2010-193324 Translation (Year: 2010).*
(Continued)

*Primary Examiner* — Twyler L Haskins
*Assistant Examiner* — Angel L Garces-Rivera
(74) *Attorney, Agent, or Firm* — Jefferson IP Law, LLP

(57) ABSTRACT

An electronic device is provided. The electronic device includes at least one lens, an image sensor, an optical image stabilization (OIS) module configured to move at least one of the image sensor or the at least one lens in relation to OIS, and an image processor electrically connected with the OIS module. The image processor is configured to control movement of the at least one lens in a specified direction by using the OIS module, and obtain a panning shot image of a moving subject while moving the at least one lens.

17 Claims, 9 Drawing Sheets

(51) Int. Cl.
*H04N 5/225* (2006.01)
*G03B 5/02* (2006.01)
*G03B 15/16* (2006.01)

(52) U.S. Cl.
CPC ......... *H04N 5/2259* (2013.01); *H04N 5/2353* (2013.01); *H04N 5/23254* (2013.01); *H04N 5/23258* (2013.01); *H04N 5/23296* (2013.01); *G03B 2205/0007* (2013.01); *H04N 5/23216* (2013.01); *H04N 5/23293* (2013.01)

(58) Field of Classification Search
CPC ............. H04N 5/2258; H04N 5/23296; H04N 5/23216; H04N 5/23293; G03B 15/16; G03B 5/02; G03B 2205/0007
See application file for complete search history.

(56) References Cited

U.S. PATENT DOCUMENTS

| | | | |
|---|---|---|---|
| 8,248,480 | B2 | 8/2012 | Matsunaga et al. |
| 9,105,550 | B2 | 8/2015 | Rhoads |
| 9,319,588 | B2 | 4/2016 | Shibata |
| 9,583,529 | B2 | 2/2017 | Rhoads |
| 2007/0206941 | A1 | 9/2007 | Maruyama et al. |
| 2008/0094498 | A1 | 4/2008 | Mori |
| 2009/0219415 | A1 | 9/2009 | Matsunaga et al. |
| 2014/0267851 | A1 | 9/2014 | Rhoads |
| 2014/0320680 | A1 | 10/2014 | Shibata |
| 2015/0350532 | A1 | 12/2015 | Rhoads |

OTHER PUBLICATIONS

JP 2006-246354 Translation (Year: 2006).*
European Search Report dated Apr. 20, 2018 issued in European Patent Application No. 17200779.1-1208.

* cited by examiner

METHOD FOR OBTAINING PANNING SHOT IMAGE AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Dec. 16, 2016 in the Korean Intellectual Property Office and assigned Serial number 10-2016-0172772, the entire disclosure of which is hereby incorporated by reference.

TECHNICAL FIELD

The present disclosure relates to obtaining a panning shot image.

BACKGROUND

In recent years, various forms of portable electronic devices, such as smartphones, tablet personal computers (PCs), and the like, have been widely used. These portable electronic devices may include a camera device. Users may take various types of images by using the camera devices. For example, a user may take a panning shot image of a moving object.

The above information is presented as background information only to assist with an understanding of the present disclosure. No determination has been made, and no assertion is made, as to whether any of the above might be applicable as prior art with regard to the present disclosure.

SUMMARY

To take an image of a moving object, a user may identify the moving object with his/her eyes and then take an image of the moving object while manually moving a camera device to correspond to the movement of the moving object. This photographing technique is referred to as panning shot. However, the panning shot technique has a problem in that, since the user manually moves the camera device, the speed of movement of the camera device may not match the speed of the moving object, and the user may not uniformly move the camera device so that the user may have difficulty acquiring an appropriate panning shot image.

Aspects of the present disclosure are to address at least the above-mentioned problems and/or disadvantages and to provide at least the advantages described below. Accordingly, an aspect of the present disclosure is to provide a panning shot image acquiring method for automatically performing panning shot to take an image of a moving object, and an electronic device supporting the method.

As described above, according to various embodiments, a panning shot image may be automatically acquired in response to a user input for making a request for panning shot capture.

In accordance with an aspect of the present disclosure, an electronic device is provided. The electronic device includes at least one lens, an image sensor, an optical image stabilization (OIS) module configured to move at least one of the image sensor or the at least one lens in relation to OIS and an image processor electrically connected with the OIS module, wherein the image processor is configured to control of moving the at least one lens in a specified direction by using the OIS module and obtain a panning shot image of a moving subject while moving the at least one lens.

In accordance with another aspect of the present disclosure, a method for acquiring a panning shot image is provided. The method includes obtaining a preview image, detecting a moving subject based on the preview image obtained by an electronic device and obtaining a panning shot image while moving an OIS module in a direction of movement of the subject.

In addition, since a panning shot is captured based on a measured speed of a specified subject, it is easy to take a panning shot with a specified level of image blur.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
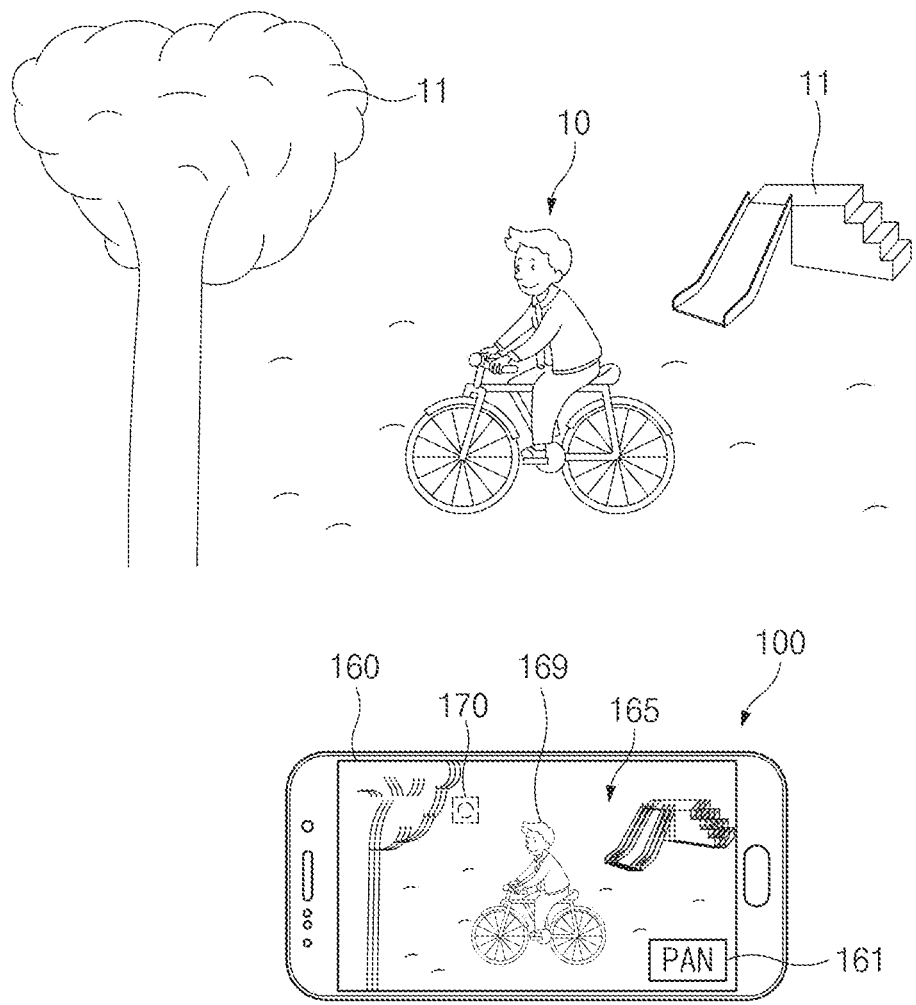
FIG. 1 illustrates a panning shot capture environment according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. Central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, wearable devices (e.g., head-mounted-devices (HDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 illustrates a panning shot capture environment according to an embodiment of the present disclosure.

Referring to FIG. 1, the panning shot capture environment of the present disclosure may include at least one moving subject 10 and an electronic device 100 that takes an image of the subject 10.

In the panning shot capture environment, the electronic device 100 may obtain (or acquire) an image that includes background objects 11 (e.g., a tree, another object, and the like), in addition to the subject 10 moving at a constant speed. For example, in the drawing, a panning shot image 165 may include the background objects 11 (e.g., a tree, a structure, and the like) and the moving subject 10. For example, the moving subject 10 may be moving at a constant or variable speed in a specific direction.

The electronic device 100 may include a camera device 170 that photographs at least part of the panning shot capture environment including the subject 10, and a display 160 that displays an image obtained (or acquired) by the camera device 170. In the drawing, the display 160 of the electronic device 100 may display a panning shot object 161 associated with a panning shot capture function and the panning shot image 165 obtained based on the panning shot capture function. In the panning shot image 165, a specified object 169 corresponding to the specified subject 10 may be clearly represented (e.g., the boundary of the object 169 may be more clearly or distinctly displayed than the neighboring area), and a background of the specified object 169 may have a specific percentage of image blur. For example, the definition of the object 169 may be defined by the thickness of the boundary of the object 169 displayed on the display 160. For example, when the definition of the object 169 is higher than or equal to a specified level, this may mean that the thickness of the boundary is less than or equal to a specified value. According to various embodiments, the boundary of the specified object 169 in the panning shot image 165 obtained by the camera device 170 of the present disclosure may have a lower value than a blur of an object, such as the background. Additionally, a specific portion of the specified object 169 (e.g., a portion having a relatively large change in motion, such as bicycle wheels, a person's legs, or the like, in the case where the person is riding a bicycle) may have a higher blur level than a blur of the surrounding background.

If a user input associated with taking an image according to a panning shot capture function is received, the camera device 170 of the electronic device 100 may obtain a panning shot image by using an optical image stabilization (OIS) module included in the camera device 170 in the state in which the electronic device 100 remains substantially motionless. The substantially motionless state may include a state in which a user holding the electronic device 100 faces a specified direction. In this operation, the electronic device 100 may be slightly moved by a shaking movement of the user's hand or may be shaken by an external force. However, the corresponding movement or shake may be regarded as a substantially motionless state. For example, the case where a lens of the camera device 170 of the electronic device 100 faces one direction (e.g., toward the specified subject 10) and the electronic device 100 (or the camera device 170) has a movement within a specified range (e.g., a movement as small as a shaking movement of the user's hand) may be regarded as the substantially motionless state.

The panning shot object 161 may include at least one of, for example, an image and text for indicating that the electronic device 100 is taking a panning shot image. According to various embodiments, the panning shot object 161 may include a shutter icon associated with panning shot capture. Accordingly, if a user input for selecting the panning shot object 161 occurs, the electronic device 100 may take the panning shot image 165 of the specified subject 10 by using the OIS module and may output the captured panning shot image 165 on the display 160.

According to various embodiments, the electronic device 100 may determine whether a condition for taking a panning shot image in a preview image obtained by the camera device 170 (e.g., a condition for acquiring a preview image including an object moving at a specified speed or higher) is satisfied. If a specified condition is satisfied, the electronic device 100 may output the panning shot object 161 on the display 160. In the case where the panning shot capture condition is not satisfied, the panning shot object 161 may not be output. Alternatively, in the case where the panning shot capture condition is not satisfied, the electronic device 100 may display the panning shot object 161 in a deactivated state in which the panning shot object 161 is not selectable.

According to various embodiments, if an input signal for making a request for panning shot capture is received, the electronic device 100 may obtain the panning shot image 165 based on when the subject 10 having a specified movement (or an object corresponding to the subject 10) is located in the center of a screen (or around the center thereof). Alternatively, the electronic device 100 may obtain the panning shot image 165 in the composition when the panning shot capture is requested. In this case, the moving object may be located on a left or right side of the screen, rather than in the center of the screen, according to the time point when the panning shot capture is performed.

According to various embodiments, in the case where a subject of interest has a specified magnitude of movement, the electronic device 100 may collect a panning shot of the corresponding subject of interest. In this regard, the electronic device 100 may automatically detect an object located at a specified position in the collected preview image (e.g., in the center of the screen) and may select (or designate) the detected object as a subject of interest. Alternatively, the electronic device 100 may select (or designate) a subject determined by a subject tracking function or an auto-focused object as a subject of interest.

As described above, in the case where the acquisition of the panning shot image 165 is requested, the electronic device 100 according to an embodiment of the present disclosure may obtain the panning shot image 165 of the specified subject 10 by using the OIS module in the state in which the lens of the camera device 170 remains substantially motionless while indicating the direction toward the moving subject. Accordingly, the electronic device 100 may obtain the panning shot image 165 with an appropriate image blur even without rotating (or moving) the electronic device 100 along the direction of movement of the specified moving subject 10 to take a panning shot. Alternatively, the electronic device 100 may detect the speed of movement of the specified subject 10 and may obtain the panning shot image 165 with an appropriate image blur based on a shutter speed or international organization for standardization (ISO) sensitivity adjusted to correspond to the detected speed.

The appropriate image blur, which is statistically or computationally acquired information, may be, for example, an image blur corresponding to 5 to 10% of the blur level applied to at least one object included in the panning shot image 165. The blur level of the object (e.g., the background or another object other than the specified object 169) may include, for example, a state in which the boundary of a subject (e.g., a tree or another object in the background) is displayed to look smeared to a specific thickness along the direction of movement of the specified subject 10. For example, when the case where the thickness of the smeared boundary corresponds to the entire image size is defined as 100%, the appropriate image blur may be defined as a state in which the thickness of the smeared boundary corresponds to 5 to 10% or 6 to 7% of the entire image size. The percentage of the appropriate image blur is merely illustrative and may be differently defined according to user adjustment or settings. In this regard, the electronic device 100 may display, on the display 160, a user interface associated with adjusting the percentage of the appropriate image blur (e.g., a screen for adjusting the appropriate image blur).

Figure 2:
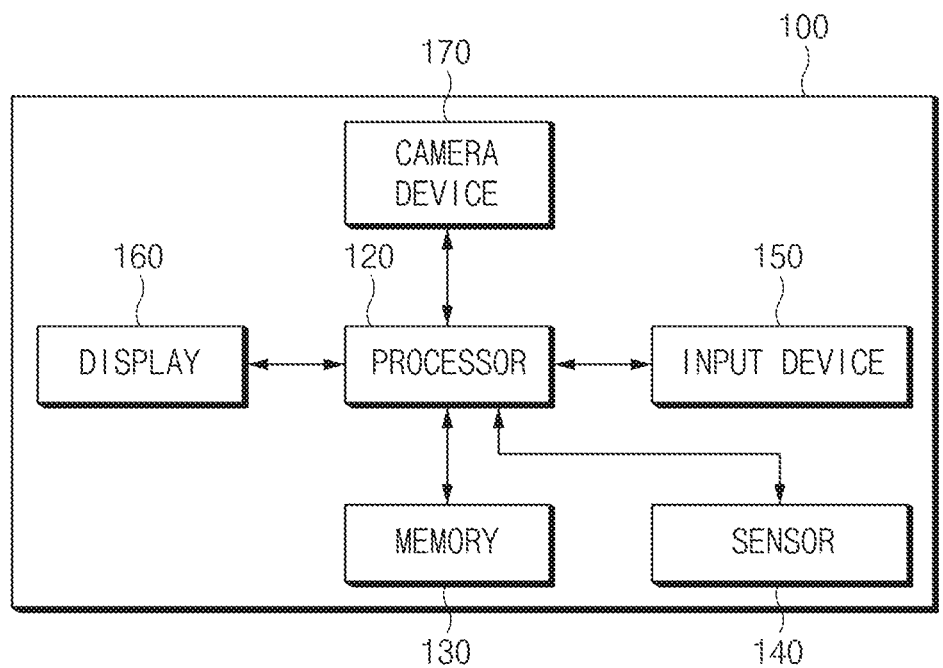
FIG. 2 illustrates a configuration of an electronic device according to an embodiment of the present disclosure.

FIG. 2 illustrates a configuration of an electronic device according to an embodiment of the present disclosure.

Referring to FIG. 2, the electronic device 100 according to an embodiment of the present disclosure may include a processor 120, a memory 130, an input device 150, the camera device 170, and a sensor 140, and may further include the display 160.

The memory 130 may store at least one application program associated with operating the electronic device 100. According to an embodiment, the memory 130 may store a camera application program associated with operating the camera device 170. The camera application program may include, for example, a first set of instructions associated with operating an OIS module (or a compensation module for a shaking movement of a user's hand) that processes OIS, a second set of instructions associated with auto focusing (AF), a third set of instructions associated with automatically adjusting color or brightness, and the like. The first set of instructions may include, for example, a set of instructions associated with a general image capture function and a set of instructions associated with a panning shot capture function. The set of instructions associated with the panning shot capture function may include, for example, a set of instructions for detecting at least one object (e.g., the object 169 of FIG. 1) in a preview image, a set of instructions for detecting the speed of a specified object (e.g., detecting a speed based on a pixel change according to a movement of an object on a screen), a set of instructions for obtaining (or calculating) an appropriate image blur of a panning shot image to be acquired and a shutter speed associated with the speed of movement of the specified object, a set of instructions for adjusting an F-number or an ISO sensitivity value to correspond to the obtained (or calculated) shutter speed, and a set of instructions for operating an OIS module to correspond to the speed of a subject.

According to various embodiments, the set of instructions associated with the panning shot capture function may include a set of instructions for detecting a camera-shake and applying the extent of the camera-shake to an OIS module that moves to obtain a panning shot image. The set of instructions for adjusting an F-number or an ISO sensitivity value to correspond to the shutter speed may include, for example, a subset of instructions for decreasing the F-number (or increasing the amount of light) as the shutter speed increases relative to a specified reference, a subset of instructions for increasing the F-number (or decreasing the amount of light) as the shutter speed decreases relative to the specified reference, a subset of instructions for increasing the ISO sensitivity value as the shutter speed increases relative to the specified reference, and a subset of instructions for decreasing the ISO sensitivity value as the shutter speed decreases relative to the specified reference.

The input device 150 may include at least one unit or at least one user interface that generates an input signal corresponding to a user input. According to an embodiment, the input device 150 may include a physical button corresponding to a shutter button. Alternatively, the input device 150 may include a physical button that generates an input signal corresponding to activation or deactivation of the camera device 170. In another case, the input device 150 may include a physical button associated with switching a panning shot capture function. According to various embodiments, the input device 150 may include a touch key that corresponds to at least one of a shutter input signal, an input signal associated with activating the camera device 170, and an input signal associated with switching a panning shot capture function. Alternatively, the input device 150 may include a touch screen display panel. In this case, the input device 150 may include the display 160 on which a shutter-related icon, an icon for executing the camera device 170, and an icon for switching a panning shot capture function are displayed.

The camera device 170 may be activated in response to a user input signal, or may be activated in response to a specified event. When activated, the camera device 170 may collect a preview image and may output the collected preview image on the display 160 in response to control of the processor 120. According to an embodiment, the camera device 170 may perform AF, auto exposure, and auto brightness adjustment. In this regard, the camera device 170 may include an AF module, a diaphragm, and the like. According to an embodiment of the present disclosure, the camera device 170 may support at least one of a general image capture function (e.g., a function of taking an image by applying an OIS module to OIS) and a panning shot capture function (e.g., a function of taking an image by applying an OIS module to panning shot capture). In this regard, the camera device 170 may include a lens, a body tube, an OIS module, and the like.

The panning shot capture function may include a processing operation of photographing a subject moving at a specified speed or higher while the direction a lens of the camera device 170 faces is substantially stationary (or fixed) and operating the OIS module (e.g., moving the OIS module in the direction of movement of the subject) to move the lens along with the subject. The camera device 170 may include an image processor that processes a panning shot capture function. Alternatively, the image processor may be included in at least part of the processor 120.

The sensor 140 may sense a movement of the electronic device 100 in a specific direction and may generate a sensor signal corresponding to the sensed movement. According to an embodiment, the sensor 140 may include at least one of an acceleration sensor, a geomagnetic sensor, and a gyro sensor. According to an embodiment, the sensor 140 may be activated in the case where a panning shot capture function of the camera device 170 is activated. The sensor 140 may provide, to the processor 120, a sensor signal corresponding to a movement of the electronic device 100 with a specified frequency or lower (e.g., a movement of the electronic device 100 caused by a shaking movement of a user's hand) while panning shot capture is being performed. The sensor 140 may be deactivated if the panning shot capture function is completed.

The display 160 may output at least one screen associated with operating the electronic device 100, in response to control of the processor 120. For example, the display 160 may output a screen including an icon associated with activating the camera device 170, in response to the control of the processor 120. The display 160 may output a preview image collected by the activated camera device 170. The display 160 may output an icon or menu for selecting a panning shot capture function in the case where the camera device 170 is activated. For example, as illustrated in FIG. 1, the display 160 may output the panning shot object 161 associated with panning shot capture. The display 160 may output the captured panning shot image 165 on a screen having a specific size. According to an embodiment, the display 160 may output a thumbnail image corresponding to the panning shot image 165.

The processor 120 may transfer and process signals associated with controlling functions of the electronic device 100. According to an embodiment, the processor 120 may perform monitoring associated with a connection state or an activated state of the camera device 170. The processor 120 may output, on the display 160, at least one icon or menu associated with activating the camera device 170. The processor 120 may control power supply to the camera device 170 and may activate the camera device 170 if a user input signal corresponding to selection of the camera device 170 is generated. If a preview image is received from the activated camera device 170, the processor 120 may control the display 160 to output the received preview image. When activating the camera device 170, the processor 120 may process a signal associated with a panning shot capture function (e.g., perform processing associated with a function of tracking an object corresponding to a subject) and may control the camera device 170.

Figure 3:
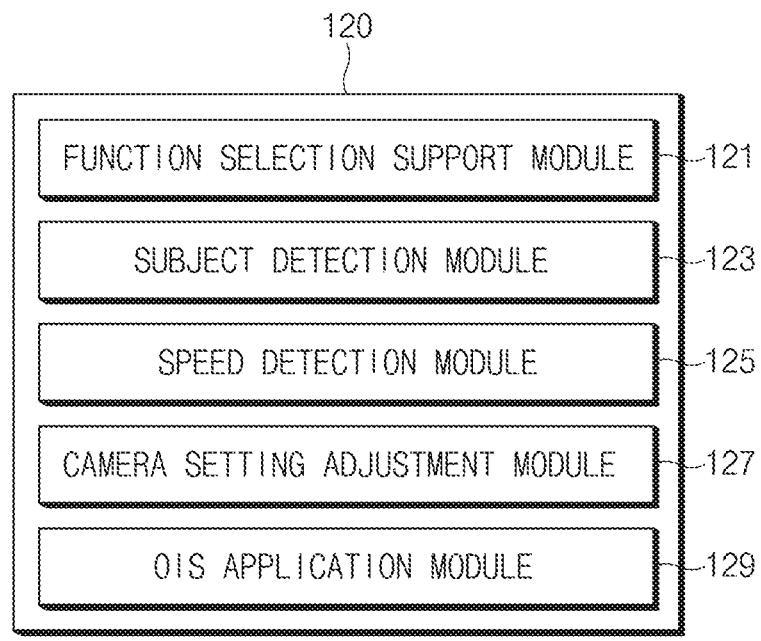
FIG. 3 illustrates a configuration of a processor according to an embodiment of the present disclosure.

FIG. 3 illustrates a configuration of a processor according to an embodiment of the present disclosure.

Referring to FIG. 3, the processor 120 according to an embodiment of the present disclosure may include a function selection support module 121, a subject detection module 123, a speed detection module 125, a camera setting adjustment module 127, and an OIS application module 129. At least some of the at least one module described above may be implemented with at least one hardware sub-processor. Alternatively, the at least one module may include at least one set of instructions loaded into the memory 130 and executed by the processor 120.

The function selection support module 121 may control activation of the camera device 170. In the operation of activating the camera device 170, the function selection support module 121 may output a menu or icon for selecting either a panning shot capture function or a general image capture function. According to various embodiments, the function selection support module 121 may output an object associated with the panning shot capture function on a standby screen or a specified screen (e.g., a screen on which a preview image is output according to the activation of the camera device 170). Alternatively, the function selection support module 121 may provide the general image capture function as a default function (e.g., a function set as a default when the camera device 170 is activated) and may allocate at least one physical button or virtual key button for executing the panning shot capture function. According to various embodiments, the function selection support module 121 may analyze a preview image and may output an object for executing the panning shot capture function or a shutter object associated with panning shot capture in the case where a subject moving at a specified speed or higher exists in the preview image.

The subject detection module 123 may detect at least one subject while the panning shot capture function is being executed. According to an embodiment, the subject detection module 123 may detect at least one object included in the preview image. In this regard, the subject detection module 123 may compare a plurality of frames (e.g., two or more frames) acquired from the preview image and may detect a moving object among the detected objects, or may detect an object moving at a specified speed or higher among the detected objects. According to various embodiments, the subject detection module 123 may output a screen for selecting at least one object in the preview image. Accordingly, a user may select an object to be photographed as a panning shot through the screen on which the preview image is output. Alternatively, in the case where a plurality of moving objects are detected, the subject detection module 123 may select an object moving within a specified speed range, among the plurality of moving objects. In this regard, the subject detection module 123 may collect information about the speed of movement of the objects from the speed detection module 125 and may detect an object moving at a specified speed based on the collected information. The subject detection module 123 may provide, to the camera setting adjustment module 127, object designation information about the object selected from the detected objects.

The speed detection module 125 may detect the speed of movement of at least one object that is displayed on the display 160 to correspond to a specified subject (e.g., the subject 10 of FIG. 1). For example, the speed detection module 125 may detect the speed of movement of a specified object based on a plurality of frames in which the specified object is included. According to an embodiment, the speed detection module 125 may detect the speed of movement and direction of an object based on the time during which a frame is acquired and the distance by which the object moves in the corresponding frame. When selecting an object corresponding to a subject specified by a user input, the speed detection module 125 may detect the speed of the corresponding object. Alternatively, the speed detection module 125 may obtain (or calculate) speed of movement information of objects included in a preview image and may provide the calculated speed of movement information of at least one object to at least one of the subject detection module 123 and the camera setting adjustment module 127. The speed of movement information may include the angular velocity of a subject (e.g., a subject in the middle of a panning shot image) relative to a lens field of view, and the speed detection module 125 may detect speed of movement information based on a pixel change per unit time of a specified object displayed on the display 160.

If the camera setting adjustment module 127 receives object designation information and speed of movement information of a specified object from the subject detection module 123 and the speed detection module 125, the camera setting adjustment module 127 may adjust camera settings based on the received information. According to an embodiment, if the speed of movement of a specified object and an exposure time (or a shutter speed) are calculated, the camera setting adjustment module 127 may adjust at least one of an ISO sensitivity value and an F-number in consideration of exposure at the time when photographing is performed, thereby ensuring appropriate brightness. The appropriate brightness may include a statistically or experimentally defined brightness range. In this operation, the camera setting adjustment module 127 may allow (or set) the ISO sensitivity not to be greater than or equal to a specified reference value to prevent the blur or roughness level of an image from exceeding a specific value due to the ISO sensitivity. According to an embodiment, the camera setting adjustment module 127 may allow (or set) the ISO sensitivity not to be greater than or equal to 400 even though adjusting the ISO sensitivity. Alternatively, the camera setting adjustment module 127 may configure a diaphragm not to be opened to a specified reference value or less for the occasion when a specified object is out of focus due to an excessive movement in the direction of the focal length of the camera device 170. For example, the camera setting adjustment module 127 may allow the F-number not to be less than or equal to 5. These settings may be varied depending on the focal length of the camera device 170.

The OIS application module 129 may perform a panning shot image acquisition function of the electronic device 100 (or the camera device 170) or OIS for the camera device 170 according to a set function thereof. For example, if a request is made to obtain a panning shot image, the OIS application module 129 may control to take a panning shot image of a subject while moving an OIS module in the direction of movement of the subject (e.g., at the same speed as the speed of movement of the subject or at a specified speed). According to various embodiments, in the case where images are collected according to a general image capture function, the OIS application module 129 may receive a sensor signal according to a camera-shake and may adjust the OIS module in response to the corresponding sensor signal to process OIS.

According to an embodiment, the OIS application module 129 may perform motion control of the OIS module if the camera setting adjustment module 127 completely adjusts at least one of the ISO sensitivity and the F-number. For example, the OIS application module 129 may adjust the speed at which the OIS module moves in a specified direction, depending on a shutter speed (may adjust the speed of movement of the OIS module to a specified speed at which the OIS module is movable within a range from a minimum distance to a maximum distance by which the OIS module moves in one direction). According to various embodiments, the OIS application module 129 may adjust the operation start time and the operation end time of the OIS module (e.g., the time during which the OIS module is controlled to move within a specified range according to a shutter speed) such that a specified object is located in the middle of a preview image screen. Alternatively, the OIS application module 129 may output, on the display 160, a user interface through which to determine where a specified object is located in an acquired panning shot image (e.g., a screen through which to determine the position of a specified object in a preview image). The OIS application module 129 may control the operation start time of the OIS module such that an object set as a default is located in the middle of the screen. If a user adjustment input (e.g., a touch input for specifying a specific position on a panning shot image including a specified object) occurs, the OIS application module 129 may control the operating time of the OIS module such that the specified object is acquired at the user-specified position on the panning shot image.

According to various embodiments, the OIS application module 129 may process OIS even while a panning shot image is being captured. For example, the OIS application module 129 may receive, from the sensor 140, a sensor signal generated by a shake of the electronic device 100 while a panning shot image is being acquired. If the sensor signal is acquired, the OIS application module 129 may extract at least one of information about the direction in which an image is shaken, the extent to which an object moves in the image, and the extent to which the image is shaken, based on the acquired sensor signal. The OIS application module 129 may apply the extracted extent of shake to taking a panning shot image. For example, in the process of acquiring a panning shot image of a specified object, the OIS application module 129 may control to obtain a panning shot image with a uniform image blur by applying the extent of shake in the direction in which the specified object moves. For example, the OIS application module 129 may determine a speed at which the OIS module is to move, based on a shutter speed and may apply the extent of shake calculated based on the sensor signal to the direction in which the OIS module moves, thereby controlling the OIS module to uniformly move without being affected by the shake. Alternatively, the OIS application module 129 may operate to obtain a panning shot image while moving at the same speed as that of a moving subject (specified object). According to an embodiment, if a camera-shake is generated by a shaking movement of a user's hand in a first direction at a different speed from the speed of movement of a subject while the specified subject is moving in the first direction, the OIS application module 129 may subtract the speed of the camera-shake generated by the shaking movement of the user's hand from the speed of movement of the OIS module that moves in the first direction. Alternatively, if a camera-shake is generated by a shaking movement of the user's hand in a second direction opposite to the first direction in which the specified subject moves, the OIS application module 129 may add the speed of the camera-shake generated by the shaking movement of the user's hand to the speed of movement of the OIS module that moves in the first direction.

According to various embodiments, the OIS application module 129 may extract the extent of shake in a second axial direction (e.g., the direction perpendicular to a first axial direction in the case where a specified object moves in the first axial direction) and may adjust a movement of the OIS module based on the extent of shake in the second axial direction to suppress a shake of a lens in the second axial direction. In the case where the camera device 170 includes two or more axial modules (e.g., 3-axis, 5-axis, and 6-axis modules or hardware apparatuses) in relation to OIS, the OIS application module 129 may use an axial module moving in the same direction as the direction of movement of a subject to obtain a panning shot image and may use the remaining axial modules to process OIS. According to various embodiments, the OIS application module 129 may control to prevent out-of-focus by using a motion tracking mode using a phase-difference distance measurement sensor.

Figure 4:
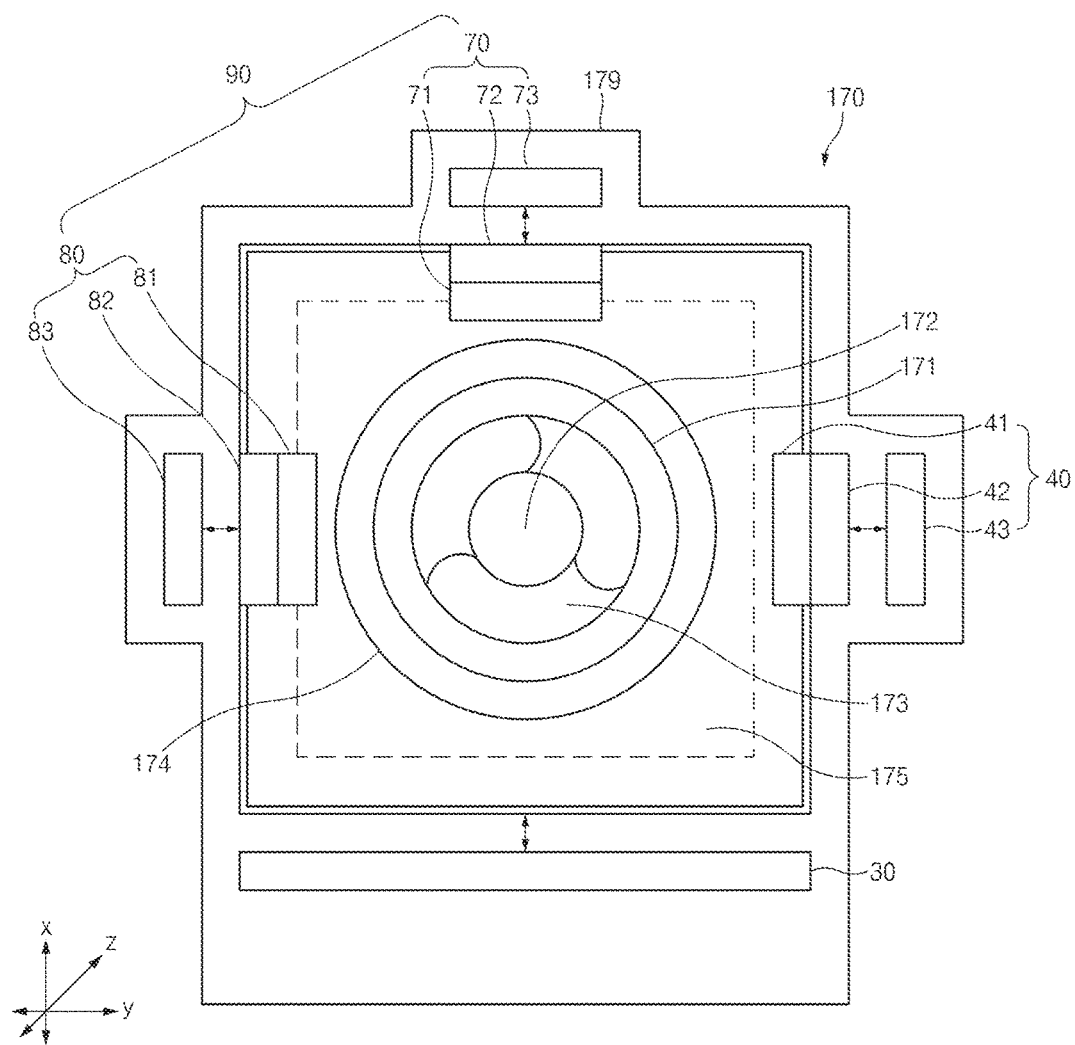
FIG. 4 illustrates a configuration of a camera device according to an embodiment of the present disclosure.

FIG. 4 illustrates a configuration of a camera device according to an embodiment of the present disclosure.

Referring to FIG. 4, the camera device 170 according to an embodiment of the present disclosure may include a case 179, an OIS module 90, an AF module 40, one or more lenses 172, a body tube 174, a diaphragm 173, a shutter 171, an image sensor 175, and a microcomputer 30 (or an image processor or the processor 120). Furthermore, the camera device 170 may further include a sensor. In addition, the camera device 170 may further include a memory that stores a program associated with driving. The memory may also store an image acquired by the image sensor 175.

The case 179 may have space therein for mounting the OIS module 90, the AF module 40, the lenses 172, the body tube 174, the diaphragm 173, the shutter 171, the image sensor 175, and the microcomputer 30. The case 179 may have, on a side thereof, a hole through which at least part of the lenses 172 is exposed to the outside, and may include a structure to which the diaphragm 173 disposed above the lenses 172 is secured. The body tube 174 having the lenses 172 therein may be disposed inside the case 179, and the case 179 may have space in which the body tube 174 is moved by the OIS module 90 or the AF module 40 in a specified direction. According to an embodiment, the image sensor 175 may be disposed on a lower side of the case 179, and the body tube 174 having the lenses 172 therein may be located above the image sensor 175. The diaphragm 173 may be disposed above the body tube 174. The microcomputer 30 may be located below the image sensor 175 or may be disposed in the same layer along with the image sensor 175.

The OIS module 90 may include a first axial module 70 and a second axial module 80. According to various embodiments, the OIS module 90 may include various other axial modules. For example, the OIS module 90 may include a 5-axis or 6-axis module. In this case, the OIS module 90 may include axial modules corresponding to various diagonal lines between axes, in addition to the first and second axial modules 70 and 80 that are perpendicular to each other. In the following description, it will be exemplified that an electronic device has two axial modules.

According to various embodiments, in the case where the OIS module 90 has a plurality of axial modules, some axial modules may be used to take a panning shot image, and the remaining axial modules may be used to process OIS to prevent a camera-shake. In this regard, the processor may be configured to identify the direction of movement of a specified object (or a main subject or a specified subject), to take a panning shot image by using an axial module corresponding to the direction of movement, and to process compensation according to OIS by using another axial module. According to an embodiment, in the case where the direction of movement of a specified object is the same as the direction of movement of the first axial module 70, the processor may be configured to take a panning shot image in a horizontal direction by using the first axial module 70 and to process compensation according to OIS in a vertical direction by using the second axial module 80.

The first axial module 70 may include a first magnet member 71, a first coil member 72, and a first driver 73 (or a first driving IC). For example, the first magnet member 71 may be disposed on a carrier that surrounds the body tube 174 and may be disposed to face the first coil member 72. Accordingly, if power is supplied to the first coil member 72, the first magnet member 71 may move the lenses 172 in a first axial direction (e.g., the X-axis direction). The first driver 73 may control power supply to the first coil member 72. According to various embodiments, the first magnet member 71 and the first coil member 72 may be disposed on a side surface of the image sensor 175 to move the image sensor 175 in the first axial direction in response to control of the first driver 73.

The second axial module 80 may include a second magnet member 81, a second coil member 82, and a second driver 83 (or a second driving IC). For example, the second magnet member 81 may be disposed on the carrier that surrounds the body tube 174 and may be disposed to face the second coil member 82. Accordingly, if power is supplied to the second coil member 82, the second magnet member 81 may move the lenses 172 in a second axial direction (e.g., the Y-axis direction). The second driver 83 may control power supply to the second coil member 82. According to various embodiments, the second magnet member 81 and the second coil member 82 may be disposed on a side surface of the image sensor 175 to move the image sensor 175 in the second axial direction in response to control of the second driver 83.

The AF module 40 may include a third magnet member 41, a third coil member 42, and a third driver 43 (or a third driving IC). The third magnet member 41 may move the body tube 174 including the OIS module 90 in a third axial direction (e.g., the Z-axis direction) if power is supplied to the third coil member 42. The third driver 43 may supply power to the third coil member 42 to adjust the position of the body tube 174 in the Z-axis direction if auto-focusing of the camera device 170 is requested. According to various embodiments, the AF module 40 may be configured to adjust the distance between the lenses 172 arranged inside the body tube 174.

The lenses 172 may include a plurality of convex or concave lenses arranged at a specified interval. The lenses 172 may be arranged inside the body tube 174. The lenses 172 may be moved in the first or second axial direction by the OIS module 90. Alternatively, the lenses 172 (or at least some of the lenses) may be moved in the third axial direction by the AF module 40.

The body tube 174 may have a cylindrical shape in which the lenses 172 are arranged. The diaphragm 173 may be disposed above the body tube 174, and the image sensor 175 may be disposed below the body tube 174. The body tube 174 may be moved in the first or second axial direction by the OIS module 90. According to various embodiments, the body tube 174 may be moved in the third axial direction by the AF module 40, or may be configured such that the gap between the lenses 172 arranged in the body tube 174 is adjusted by the AF module 40.

The diaphragm 173 may be disposed above the body tube 174 or in front of the lenses 172 to adjust the amount of light incident on the lenses 172. The diaphragm 173 may include, for example, a plurality of blades, and the size of a central hole formed by the overlapping blades may be adjusted by closing the blades inwards or opening the blades.

The shutter 171 may be disposed to adjust exposure of the image sensor 175 or exposure of a mirror that transmits light to the image sensor 175. The speed of the shutter 171 may be adjusted in response to control of the microcomputer 30.

The image sensor 175 may be disposed below the body tube 174 and may include at least one pixel that stores light input through the lenses 172. When the shutter 171 opens, light may be incident on the image sensor 175, and therefore information stored in the image sensor 175 may be transferred to a display or a memory. The image sensor 175 may be moved in the first or second axial direction by the OIS module 90.

The microcomputer 30 may be at least part of the above-described processor 120. Alternatively, the microcomputer 30 may include at least one processor independent of the above-described processor 120. The microcomputer 30 may be disposed inside the case 179 or on the exterior of the case 179 (e.g., on a side of the housing of the electronic device 100) and may be electrically connected with the image sensor 175, the OIS module 90, the AF module 40, and the like.

The microcomputer 30 may use the OIS module 90 for OIS when executing a general image capture function. For example, the microcomputer 30 may collect a sensor signal according to a camera-shake through the sensor 140 (e.g., an acceleration sensor, a geomagnetic sensor, a gyro sensor, a phase difference detection sensor, or the like) and may control the OIS module 90 to perform an opposite motion in response to the collected sensor signal. For example, in the case where a camera-shake of a specified magnitude or less (or a camera-shake corresponding to frequencies lower than or equal to a specified frequency) occurs in the first axial direction, the microcomputer 30 may operate the OIS module 90 in the opposite direction to the first axial direction to perform OIS.

According to various embodiments, when executing a panning shot capture function, the microcomputer 30 may use the OIS module 90 for panning shot capture. For example, if a request is made to take a panning shot, the microcomputer 30 may take a panning shot of a specified subject while moving the OIS module 90 in a first direction (e.g., the first or second axial direction or a specified direction between the first and second axes). In this operation, the microcomputer 30 may adjust the speed of movement of the OIS module 90 to correspond to the speed of the shutter 171. For example, the microcomputer 30 may control the OIS module 90 such that the speed of the shutter 171 is equal to the speed of movement of the OIS module 90 within a distance by which the OIS module 90 is movable. The speed of the shutter 171 may include a speed set to have an appropriate image blur.

According to various embodiments, when executing a panning shot capture function, the microcomputer 30 may correct a movement of the OIS module 90 based on a sensor signal acquired from the sensor 140. For example, while the OIS module 90 is moving in the direction in which a specified subject moves, the microcomputer 30 may correct the movement of the OIS module 90 according to the extent of camera-shake to allow the OIS module 90 to move at a uniform speed or at the same speed as that of the moving subject.

The microcomputer 30 may provide a user interface to allow a user to select either a general image capture function or a panning shot capture function. For example, the microcomputer 30 may output, on the display 160, an icon or menu associated with selection of the general image capture function and an icon or menu associated with selection of the panning shot capture function. According to various embodiments, the camera device 170 may further include a microphone and may perform either the general image capture function or the panning shot capture function according to a user voice input.

According to various embodiments, the microcomputer 30 may operate only some modules of the OIS module 90 according to an arrangement state of the camera device 170 (or the electronic device 100). For example, in the case where the camera device 170 (or the electronic device 100) is arranged in a portrait mode state, the microcomputer 30 may control the first axial module 70 to obtain a panning shot image. Here, the first axial module 70 may be a module that operates to move the lenses 172 in the horizontal direction in the state in which the camera device 170 (or the electronic device 100) is arranged in the portrait mode state. Alternatively, in the case where the camera device 170 (or the electronic device 100) is arranged in a landscape mode state, the microcomputer 30 may control the second axial module 80 to obtain a panning shot image. Here, the second axial module 80 may be a module that operates to move the lenses 172 in the vertical direction in the state in which the camera device 170 (or the electronic device 100) is arranged in the landscape mode state.

According to various embodiments, the microcomputer 30 may operate a specified module according to the direction of movement of a specified subject, irrespective of an arrangement state of the camera device 170 (or the electronic device 100). For example, in the case where the specified subject moves in the first axial direction, the microcomputer 30 may move the lenses 172 by using the first axial module 70. In the case where the specified subject moves in the second axial direction, the microcomputer 30 may move the lenses 172 by using the second axial module 80. In the case where the specified subject moves in any direction (e.g., any direction between the first and second axes), the microcomputer 30 may move the lenses 172 by using both the first axial module 70 and the second axial module 80.

Figure 5:
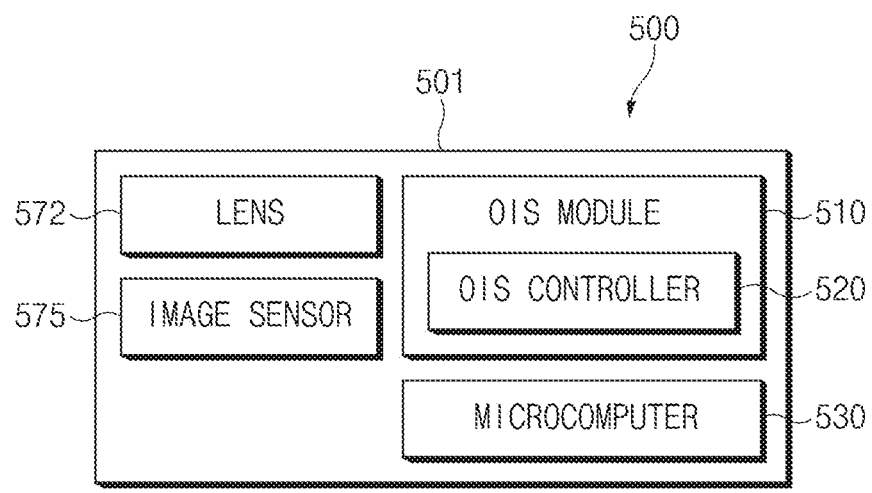
FIG. 5 illustrates a configuration of a camera device according to another embodiment of the present disclosure.

FIG. 5 illustrates a configuration of a camera device according to another embodiment of the present disclosure.

Referring to FIG. 5, a camera device 500 according to another embodiment of the present disclosure may include a case 501, a lens 572, an OIS module 510, an OIS controller 520, a microcomputer 530 (e.g., an image processor, the microcomputer 30, or the processor 120), and an image sensor 575. In addition, the camera device 500 may further include a memory that stores a program or at least one set of instructions associated with operating the microcomputer 530.

The case 501 may have space therein for mounting the lens 572, the OIS module 510, the OIS controller 520, the microcomputer 530, and the image sensor 575. The microcomputer 530 may be disposed on the exterior of the case 501 according to a design method. The case 501 may have, on a side thereof, a hole through which at least part of the lens 572 is exposed to the outside to allow light to enter the lens 572.

The lens 572 may be disposed inside the case 501, and at least part of the lens 572 may be exposed to the outside through the hole of the case 501. Light incident on the lens 572 may be transmitted to the image sensor 575. The lens 572 may be moved in a specified direction (e.g., a first axial direction, a second axial direction, or a specific direction between the first and second axes) by the OIS module 510.

The OIS module 510 may move the lens 572 in a specified direction. According to an embodiment, the OIS module 510 may include a magnet member and a coil member, and if power is supplied to the coil member, the OIS module 510 may move the lens 572 in a specified direction by a repulsive force or an attractive force between the coil member and the magnet member. In this regard, the magnet member of the OIS module 510 may be secured to a body tube in which the lens 572 is disposed, or may be secured to a side of a carrier that fixes the body tube, and the coil member may be disposed to face the magnet member.

In the case where the OIS module 510 includes the magnet member and the coil member, the OIS controller 520 may adjust the amount of power supplied to the coil member and the time to supply power to the coil member under control of the microcomputer 530.

The image sensor 575 may be disposed below the lens 572 and may store light input through the lens 572. The light stored in the image sensor 575 may be transferred to a display or a memory.

The microcomputer 530 may control either a general image capture function or a panning shot capture function according to a user's settings or a user input. In this regard, the microcomputer 530 may allocate at least one physical key for executing the panning shot capture function or may output, on the display, a virtual key button for executing the panning shot capture function. Alternatively, the camera device 500 may further include a microphone, and the microcomputer 530 may perform the panning shot capture function according to a user voice input. In regard to panning shot capture, the microcomputer 530 may obtain a panning shot image according to the contents described above with reference to FIG. 4.

According to various embodiments, the present disclosure provides an electronic device. The electronic device may include an at least one lens, an image sensor, an OIS module configured to move at least one of the image sensor and the at least one lens in relation to OIS and an image processor electrically connected with the OIS module, wherein the image processor is configured to control of moving the at least one lens in a specified direction by using the OIS module and obtain a panning shot image of a moving subject while moving the at least one lens.

According to an embodiment, the image processor may be configured to detect an angular velocity of the subject by using an image of a first camera configured to obtain an image having a relatively wide angle and obtain a panning shot image based on a second camera configured to be moved by the OIS module and having a longer focal length than the first camera.

According to an embodiment, the image processor may be configured to detect a speed of the subject and obtain a shutter speed by which a background of the subject has a specified percentage of image blur, based on the detected speed of the subject.

According to an embodiment, the image processor may be configured to adjust at least one of sensitivity of image exposure, an F-number, and a shutter speed to adjust an image blur thickness of a panning shot image while maintaining exposure of the panning shot image to be obtained at a specified level.

According to an embodiment, the image processor may be configured to allow a sensitivity adjustment limit of the image exposure and allow the sensitivity of the image exposure adjusted to correspond to the shutter speed not to exceed the sensitivity adjustment limit of the image exposure.

According to an embodiment, the image processor may be configured to allow a diaphragm adjustment limit and allow an F-number adjusted to correspond to the shutter speed not to exceed the diaphragm adjustment limit.

According to an embodiment, the OIS module may include a first axial module configured to move the at least one lens in a first axial direction and a second axial module configured to move the at least one of the lens in a second axial direction different from the first axial direction.

According to an embodiment, the image processor may be configured to drive at least one of the first and second axial modules to move the at least one lens in the same direction as a direction of movement of the subject.

According to an embodiment, the electronic device may further include a sensor configured to generate a sensor signal according to a shake of the electronic device and the image processor may be configured to adjust a speed of movement of the OIS module in relation to the acquisition of the panning shot image according to the sensor signal.

According to an embodiment, the image processor may be configured to move the OIS module in a direction corresponding to the direction of movement of the subject by applying the sensor signal and to move the OIS module at a speed of movement of an image that is obtained to be identical with the speed of movement of the subject.

According to an embodiment, the image processor may be configured to automatically select a subject moving at a specified speed or higher as an object to which a panning shot capture function is to be applied, based on a preview image and select a subject moving within a specified speed range as an object to which the panning shot capture function is to be applied, if a plurality of subjects moving at the specified speed or higher are detected.

According to an embodiment, the electronic device may further include a display and the image processor may be configured to output, on the display, at least one object corresponding to at least one subject moving at a specified speed or higher based on a preview image and to select the at least one object as an object to which a panning shot capture function is to be applied in response to a user input.

According to an embodiment, the OIS module may include a plurality of axial modules configured to move the at least one lens in different directions, and the processor may be configured to obtain a panning shot image by using an axial module corresponding to a direction of movement of the specified object, among the plurality of axial modules, and to apply the remaining axial modules to OIS.

Figure 6:
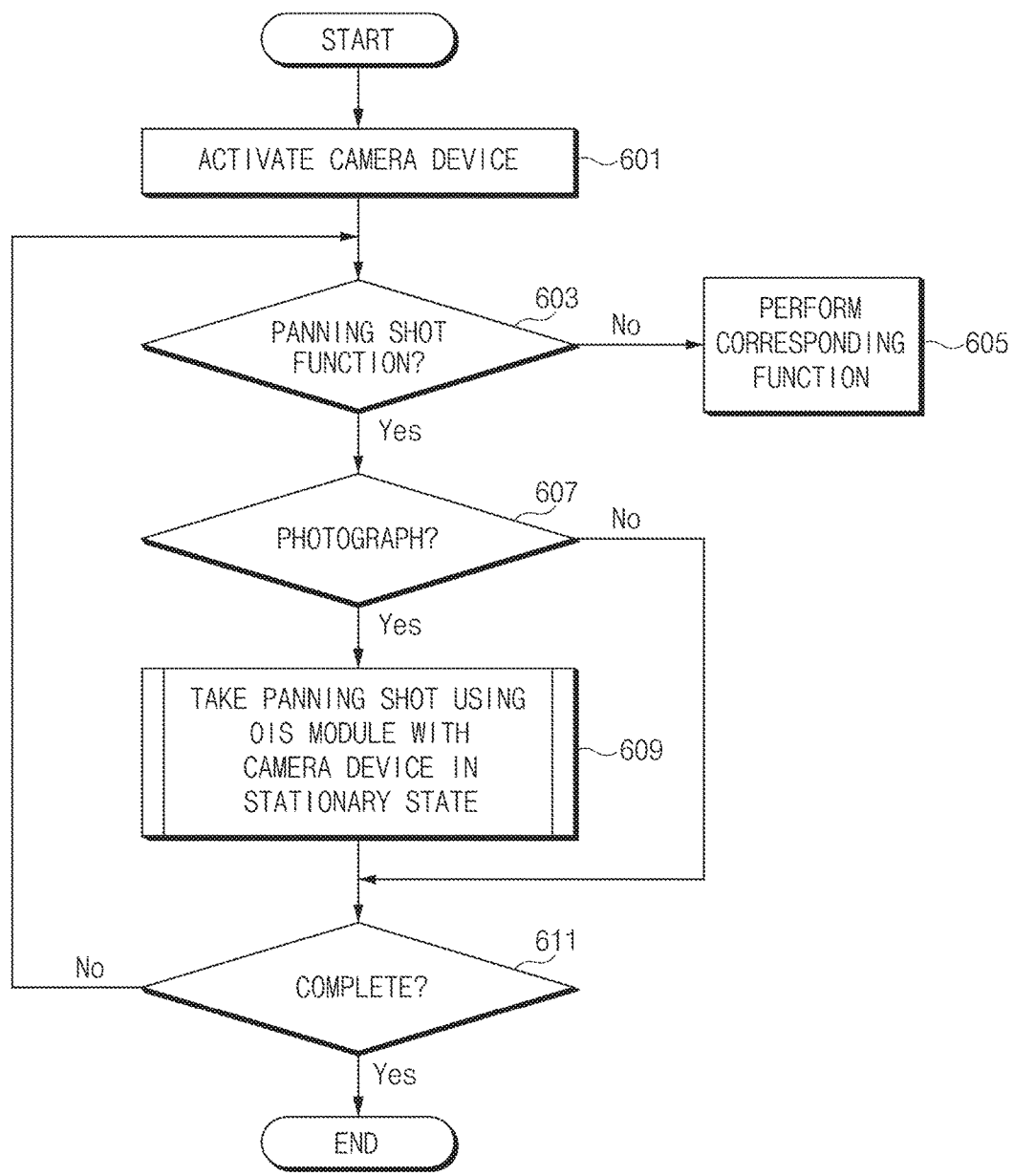
FIG. 6 is a flowchart illustrating a method for acquiring a panning shot image, according to an embodiment of the present disclosure.

FIG. 6 is a flowchart illustrating a method for acquiring a panning shot image, according to an embodiment of the present disclosure.

Referring to FIG. 6, in regard to the panning shot image acquiring method of the present disclosure, in operation 601, the processor 120 (e.g., the microcomputer 30, the microcomputer 530, or the image processor) of the electronic device 100 may activate the camera device 170 or 500. In this regard, the electronic device 100 may provide at least one input interface associated with the activation of the camera device 170 or 500. For example, the electronic device 100 may provide at least one of a physical button, a virtual key button, and a voice recognition function that activate the camera device 170 or 500. According to an embodiment, the processor 120 may output, on the display 160, an icon or menu for activating the camera device 170 or 500 and may activate the camera device 170 or 500 in response to a user input for selecting the corresponding menu or icon.

In operation 603, the processor 120 may determine whether there is a setting or a user input in relation to execution of a panning shot capture function. For example, when activating the camera device 170 or 500, the processor 120 may determine whether there is a user input associated with executing the panning shot capture function (e.g., a selection of a menu or icon associated with the panning shot capture function). Alternatively, when activating the camera device 170 or 500, the processor 120 may determine whether the panning shot capture function has been set to be executed. According to various embodiments, the processor 120 may detect at least one object in a preview image, and in the case where a moving object is included in the objects, the processor 120 may determine that the panning shot capture function has been automatically executed.

If there is no event associated with executing the panning shot capture function, the processor 120 may, in operation 605, perform a corresponding function according to a user input or set scheduling information. For example, the processor 120 may obtain a preview image and may output the acquired preview image on the display 160. Alternatively, the processor 120 may take a still image or a moving image in response to a user input. In the operation of collecting the preview image, or in the operation of collecting the still image or the moving image, the processor 120 may perform OIS by using the OIS module 90.

In the case where there is a user input or setting associated with executing the panning shot capture function, the processor 120 may perform an operation associated with executing the panning shot capture function. For example, the processor 120 may configure the OIS module 90 to be applied to the execution of the panning shot capture function. Accordingly, the OIS module 90 may stand by until a user input or specified input event associated with panning shot capture is received, without performing an operation associated with OIS.

In operation 607, the processor 120 may determine whether a user input (e.g., a shutter input for panning shot capture) or a specified input event (e.g., a voice input) associated with panning shot capture is received. In this regard, the processor 120 may determine whether a button input (e.g., a shutter button) associated with the user input occurs. Alternatively, the processor 120 may output, on the display 160, an icon (e.g., a shutter icon) associated with panning shot capture and may determine whether an event for selecting the corresponding icon occurs.

According to various embodiments, while executing a general image capture function, the processor 120 may analyze a preview image to determine whether a subject moving at a specified speed or higher is present in the preview image. In the case where there is a subject moving at the specified speed or higher, the processor 120 may output a panning shot shutter icon for taking a panning shot image associated with the corresponding subject. If the panning shot shutter icon is output, the processor 120 may, in operation 607, determine whether a user input for selecting the panning shot shutter icon occurs.

If an event associated with a request for photographing (e.g., a shutter input) occurs, the processor 120 may, in operation 609, perform panning shot capture by using the OIS module 90 in the state in which the camera device 170 or 500 is stationary or remains substantially motionless.

In operation 611, the processor 120 may determine whether an event associated with completion of the panning shot capture function occurs. If there is no event associated with completion of the panning shot capture function, the processor 120 may return to the state prior to operation 603 to perform the subsequent operations again. If an event associated with completion of the panning shot capture function occurs, the processor 120 may complete the panning shot capture function and may return to a specified state. For example, the processor 120 may complete the panning shot capture function and deactivate the camera device 170 or 500, or may complete the panning shot capture function and may return to a general state (e.g., a state in which the OIS module 90 is used for OIS).

Figure 7:
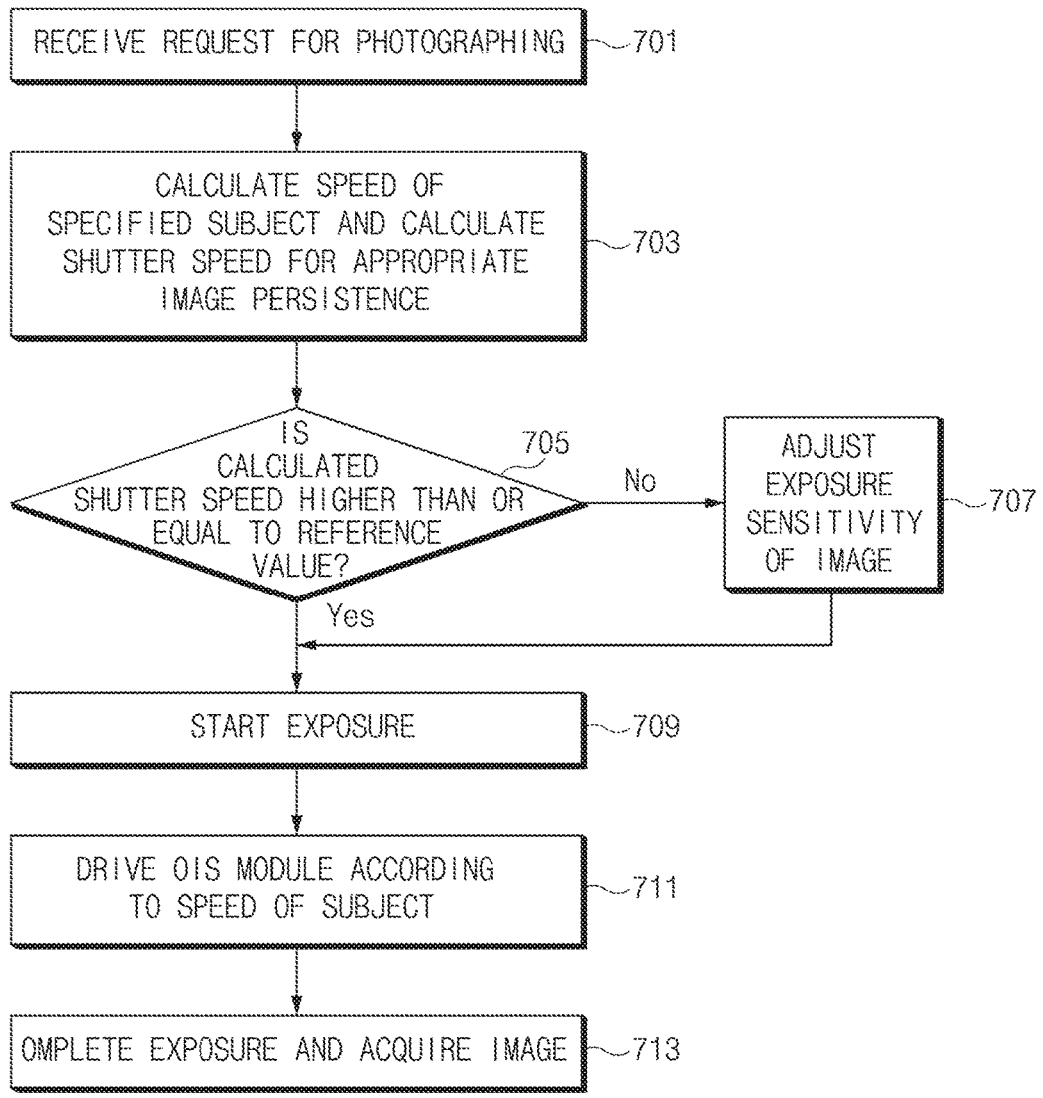
FIG. 7 is a flowchart illustrating a processor operation associated with a panning shot image acquiring method, according to an embodiment of the present disclosure.

FIG. 7 is a flowchart illustrating a processor operation associated with a panning shot image acquiring method, according to an embodiment of the present disclosure.

Referring to FIG. 7, in regard to the panning shot image acquiring method of the present disclosure, in operation 701, the processor 120 (e.g., the microcomputer 30, the microcomputer 530, or the image processor) may receive a request for photographing. For example, as described above, the processor 120 (e.g., the function selection support module 121) may determine whether a shutter input associated with panning shot capture is received.

In operation 703, the processor 120 (e.g., the subject detection module 123 and the speed detection module 125) may obtain the speed of a specified subject and may obtain a shutter speed for an appropriate image blur. For example, the processor 120 may obtain the speed of the specified subject by using frames acquired from a preview image. According to an embodiment, the processor 120 may obtain the speed of the specified subject based on the speed at which the frames are acquired and the distance by which the specified subject moves in the frames. The processor 120 may obtain the shutter speed based on the speed of the specified subject. For example, the processor 120 may allow (or set) the speed of the specified subject to the shutter speed. In the case where the shutter speed has several specified values, the processor 120 may select a shutter speed similar to the subject speed.

In operation 705, the processor 120 (e.g., the camera setting adjustment module 127) may determine whether the calculated shutter speed is higher than or equal to a reference value. The reference value may include, for example, a value sufficient to obtain an appropriate image blur when a panning shot is acquired. For example, the reference value may include such a shutter speed that a blur level of about 5 to 10% is represented in a panning shot image to be acquired.

In the case where the calculated shutter speed is lower than or equal to the reference value, the processor 120 (e.g., the camera setting adjustment module 127) may, in operation 707, adjust the exposure sensitivity (e.g., ISO sensitivity) of an image to have an appropriate image blur. As described above, the appropriate image blur may include a state in which a blur represented in a panning shot image (e.g., the extent to which a boundary blurs) has a specified percentage. In the operation of adjusting the exposure sensitivity of the image, the processor 120 may perform control such that the exposure sensitivity of the image is not adjusted to a specified limit or more (e.g., ISO 400, ISO 500, or the like). In the case where the calculated shutter speed is higher than or equal to the reference value, the processor 120 (e.g., the camera setting adjustment module 127) may, in operation 709, start exposure.

In operation 711, the processor 120 (e.g., the camera setting adjustment module 127) may drive the OIS module 90 according to the speed of the subject. According to an embodiment, the processor 120 may operate a shutter while moving the OIS module 90 according to the direction of movement and speed of the specified subject. When operating the OIS module 90, the processor 120 (e.g., the OIS application module 129) may collect a sensor signal according to a camera-shake and may apply the collected sensor signal to a movement of the OIS module 90.

In operation 713, the processor 120 may complete the exposure and may obtain an image (a panning shot). The processor 120 may output the acquired panning shot image on the display 160. Alternatively, the processor 120 may store the acquired panning shot image in a memory. In another case, the electronic device 100 may further include a communication circuit and may transmit the panning shot image to an external server in response to a user input.

According to various embodiments, a method for acquiring a panning shot image is provided. The method may include obtaining a preview image, detecting a moving subject based on the preview image obtained by an electronic device and obtaining a panning shot image while moving an OIS module in a direction of movement of the subject.

According to an embodiment, the method may further include determining whether a subject having a movement of a specified magnitude or more exists in the preview image, outputting, on a display, a shutter button associated with taking the panning shot image in a case where the subject having the movement of the specified magnitude or more exists in the preview image and omitting the outputting of the shutter button associated with taking the panning shot image on the display, or outputting a shutter button configured to indicate a deactivated state of a panning shot capture function in a case where the subject having the movement of the specified magnitude or more does not exist in the preview image.

According to an embodiment, the method may further include maintaining exposure of a panning shot image to be obtained at a specified level and simultaneously adjusting at least one of sensitivity of image exposure, an F-number, and a shutter speed such that an image blur thickness to be displayed on the panning shot image has a specified thickness.

According to an embodiment, the method may further include collecting a sensor signal according to a shake of the electronic device and adjusting a speed of the OIS module moving in relation to the acquisition of the panning shot image according to the sensor signal.

According to an embodiment, the adjusting of the speed may include moving the OIS module at the same speed as a speed of movement of the subject in a direction corresponding to the direction of movement of the subject by applying the sensor signal.

According to an embodiment, the method may further include detecting subjects having a movement of a specified magnitude or more and automatically selecting an object corresponding to a subject satisfying a specified condition, among the subjects having the movement of the specified magnitude or more, or selecting a subject selected by a user input to be a subject captured as the panning shot image.

According to an embodiment, the obtaining of the panning shot image may include obtaining the panning shot image by using an axial module moving in the same direction as the direction of movement of the subject, among a plurality of axial modules included in the OIS module, and compensating according to OIS by using the remaining axial modules.

Figure 8:
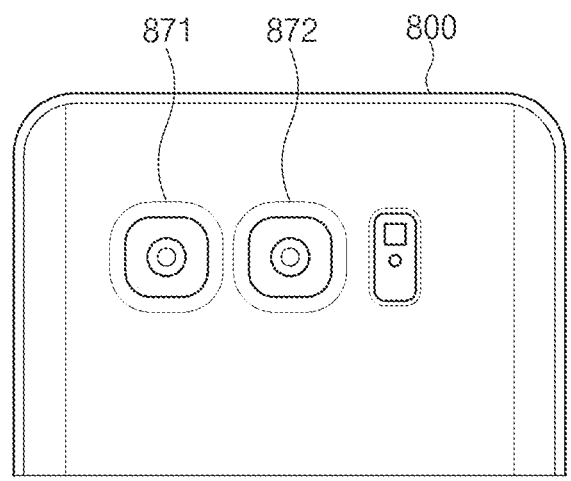
FIG. 8 illustrates a configuration of an electronic device capable of taking a panning shot, according to another embodiment of the present disclosure.

FIG. 8 illustrates an electronic device according to another embodiment of the present disclosure.

Referring to FIG. 8, an electronic device 800 according to an embodiment of the present disclosure may include a housing and first and second cameras 871 and 872 having a lens exposed through one side of the housing. The first camera 871 may include, for example, a wide camera that has a relatively short focal length and is capable of acquiring an image having a relatively wide angle. The second camera 872 may include a tele camera having a relatively long focal length.

The first camera 871 may track the position of a main subject in a panning shot image and the angular velocity of the image. The second camera 872 may obtain a panning shot image of the main subject by using an OIS module.

The first camera 871 may include the field of view of the second camera 872. The first camera 871 may also obtain an image outside an image circle that the second camera 872 may not take.

To track a movement of a main subject of the second camera 872, the first camera 871 may read out an image frame for a shorter period of time than the exposure time of the second camera 872 and may more frequently and rapidly read out continuous image frames.

For an image acquired based on the first camera 871, a processor of the electronic device 800 may track an object corresponding to a main subject (e.g., an object serving as a main object of a panning shot image and moving at a specified speed or higher) and may perform an auto-focus function on the corresponding object. In regard to tracking the subject, the processor may perform the tracking operation through edge detection or color information classification for the main subject in the image acquired by the first camera 871. The processor of the electronic device 800 may obtain a panning shot image of the main subject by using an OIS module included in the second camera 872. In this regard, the processor of the electronic device 800 may obtain a panning shot image of the main subject while moving the OIS module by using the above-described method, the OIS module being configured to adjust a movement of a lens or an image sensor of the second camera 872 in response to a camera-shake. In this operation, the processor may pan a subject entering the field of view of the second camera 872 in the field of view of the first camera 871 by using the OIS module of the second camera 872 and may output a panning shot image captured by the second camera 872 on a display or may store the panning shot image in a memory.

In the above-described operation, the processor of the electronic device 800 may process a preview image (or a live view image) by using the field of view of the second camera 872 and may capture the image acquired by the first camera 871 as a behind background.

The first camera 871 may support a fast readout function and a skip readout function of an image sensor to have a relative advantage in tracking the main subject. Alternatively, the first camera 871 may synchronize (or match) the readout speed of each frame with the second camera 872 for synchronization of an image. As described above, the first camera 871 may have various functions necessary for tracking a subject, and the second camera 872 may have various functions necessary for acquiring a panning shot.

Figure 9:
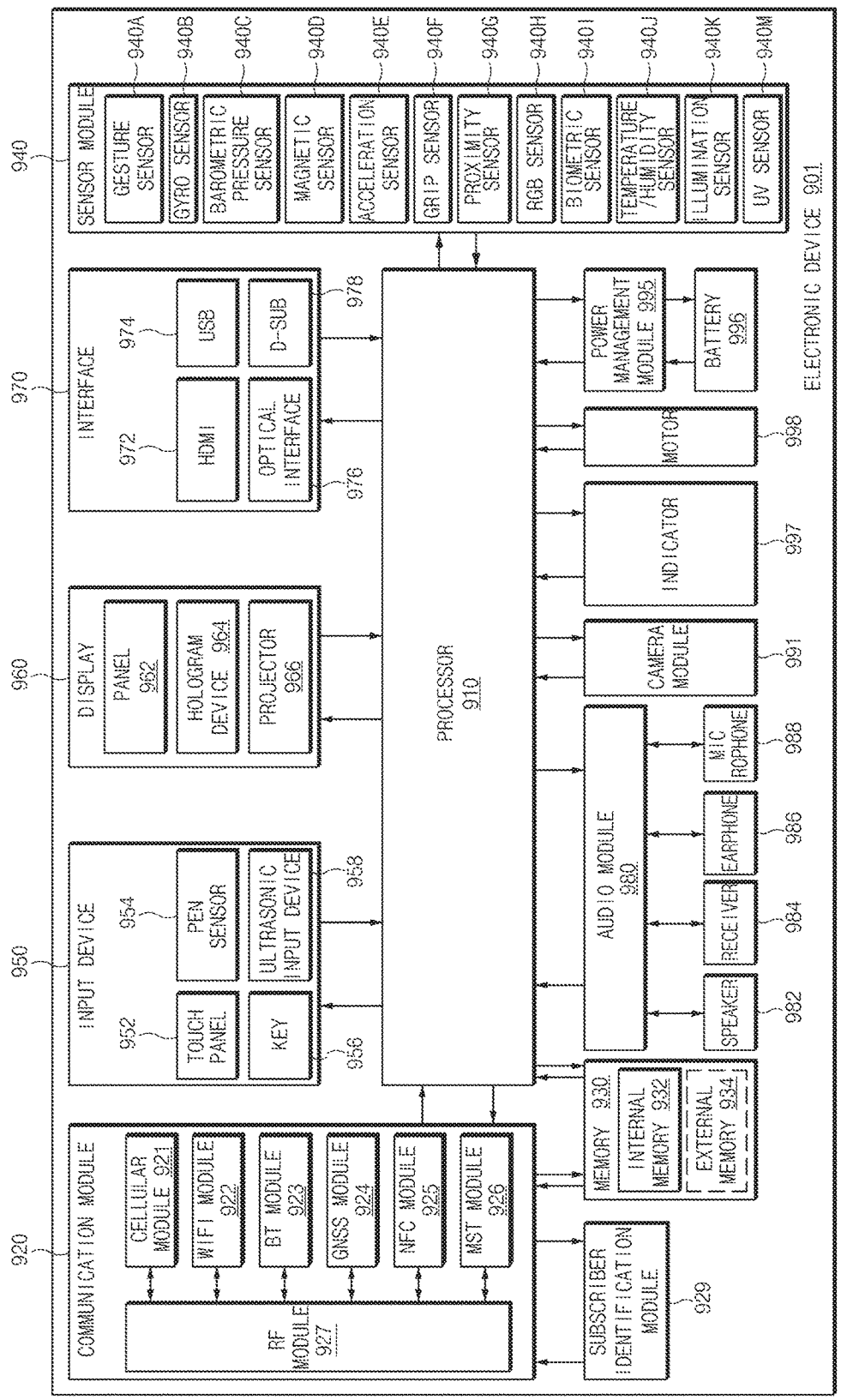
FIG. 9 illustrates a configuration of an electronic device capable of taking a panning shot, according to another embodiment of the present disclosure.

FIG. 9 illustrates a configuration of an electronic device capable of taking a panning shot, according to another embodiment of the present disclosure.

The electronic device 901 may include, for example, all or a part of the electronic device 100 illustrated in FIG. 1 or 2. The electronic device 901 may include at least one processor (e.g., AP) 910, a communication module 920, a subscriber identification module 929, a memory 930, a sensor module 940, an input device 950, a display 960, an interface 970, an audio module 980, a camera module 991, a power management module 995, a battery 996, an indicator 997, and a motor 998. The processor 910 may drive, for example, an operating system (OS) or an application program to control a plurality of hardware or software elements connected to the processor 910 and may process and compute a variety of data. For example, the processor 910 may be implemented with a system on chip (SoC). According to an embodiment, the processor 910 may further include a graphic processing unit (GPU) and/or an image signal processor (ISP). The processor 910 may include at least some (e.g., a cellular module 921) of the elements illustrated in FIG. 9. The processor 910 may load an instruction or data, which is received from at least one of other elements (e.g., a nonvolatile memory), into a volatile memory and may process the loaded instruction or data. The processor 910 may store the resultant data in the nonvolatile memory.

The communication module 920 may include, for example, the cellular module 921, a wireless-fidelity (Wi-Fi) module 922, a Bluetooth (BT) module 923, a global navigation satellite system (GNSS) module 924 (e.g., a GPS module, a Glonass module, a Beidou module, or a Galileo module), a near field communication (NFC) module 925, a magnetic secure transmission (MST) module 926, and a radio frequency (RF) module 927.

The cellular module 921 may provide, for example, a voice call service, a video call service, a text message service, or an Internet service, and the like through a communication network. According to an embodiment, the cellular module 921 may identify and authenticate the electronic device 901 in a communication network using the subscriber identification module (SIM) 929 (e.g., a SIM card). According to an embodiment, the cellular module 921 may perform at least part of functions which may be provided by the processor 910. According to an embodiment, the cellular module 921 may include a communication processor (CP).

The Wi-Fi module 922, the BT module 923, the GNSS module 924, the NFC module 925, or the MST module 926 may include, for example, a processor for processing data transmitted and received through the corresponding module. According to various embodiments, at least some (e.g., two or more) of the cellular module 921, the Wi-Fi module 922, the BT module 923, the GNSS module 924, the NFC module 925, or the MST module 926 may be included in one integrated chip (IC) or one IC package.

The RF module 927 may transmit and receive, for example, a communication signal (e.g., an RF signal). Though not shown, the RF module 927 may include, for example, a transceiver, a power amplifier module (PAM), a frequency filter, or a low noise amplifier (LNA), or an antenna, and the like. According to another embodiment, at least one of the cellular module 921, the Wi-Fi module 922, the BT module 923, the GNSS module 924, the NFC module 925, or the MST module 926 may transmit and receive an RF signal through a separate RF module.

According to various embodiments, the communication module 920 may transmit a panning shot image acquired by the electronic device 901 to a server or an external electronic device in response to control of the processor 910. Alternatively, the communication module 920 may receive a panning shot image from the server or the external electronic device. According to various embodiments, in the case where the camera module 991 (or the camera device) and the display 960 are separated from each other in hardware, the communication module 920 may establish a communication channel between the camera module 991 and the display 960 and may transfer a panning shot image acquired by the camera module 991 to the display 960.

The memory 930 may include, for example, an embedded memory 932 or an external memory 934. The embedded memory 932 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 934 may include a flash drive, for example, a compact flash (CF), a secure digital (SD), a micro-SD, a mini-SD, an extreme digital (xD), a multimedia card (MMC), or a memory stick, and the like. The external memory 934 may operatively and/or physically connect with the electronic device 901 through various interfaces.

According to an embodiment, the memory 930 may store the panning shot image. The panning shot image stored in the memory 930 may be distinguished from other general images. For example, an identifier for distinguishing the panning shot image may be stored in a header value of the panning shot image. According to an embodiment, the memory 930 may include a separate folder for storing only the panning shot images.

The sensor module 940 may measure, for example, a physical quantity or may detect an operation state of the electronic device 901, and may convert the measured or detected information to an electric signal. The sensor module 940 may include at least one of, for example, a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., red, green, blue (RGB) sensor), a biometric sensor 940I, a temperature/humidity sensor 940J, an illumination sensor 940K, or an ultraviolet (UV) sensor 940M. Additionally or alternatively, the sensor module 940 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 940 may further include a control circuit for controlling at least one or more sensors included therein. According to various embodiments, the electronic device 901 may further include a processor configured to control the sensor module 940, as part of the processor 910 or to be independent of the processor 910. While the processor 910 is in a sleep state, the electronic device 901 may control the sensor module 940.

The input device 950 may include, for example, a touch panel 952, a (digital) pen sensor 954, a key 956, or an ultrasonic input device 958. The touch panel 952 may use at least one of, for example, a capacitive type, a resistive type, an infrared type, or an ultrasonic type. Also, the touch panel 952 may further include a control circuit. The touch panel 952 may further include a tactile layer and may provide a tactile reaction to a user. The (digital) pen sensor 954 may be, for example, part of the touch panel 952 or may include a separate sheet for recognition. The key 956 may include, for example, a physical button, an optical key, or a keypad. The ultrasonic input device 958 may allow the electronic device 901 to detect a sound wave using a microphone (e.g., a microphone 988) and to verify data through an input tool generating an ultrasonic signal. According to an embodiment, the input device 950 may generate an input signal associated with activating a panning shot capture function, a shutter input signal associated with panning shot capture, and the like in response to user control.

The display 960 (e.g., a display 160 of FIG. 1) may include a panel 962, a hologram device 964, or a projector 966. The panel 962 may include the same or similar configuration to the display 160. The panel 962 may be implemented to be, for example, flexible, transparent, or wearable. The panel 962 and the touch panel 952 may be integrated into one module. The hologram device 964 may show a stereoscopic image in a space using interference of light. The projector 966 may project light onto a screen to display an image. The screen may be positioned, for example, inside or outside the electronic device 901. According to an embodiment, the display 960 may further include a control circuit for controlling the panel 962, the hologram device 964, or the projector 966. According to an embodiment, the display 960 may output at least one of a preview image according to activation of the camera module 991, a screen associated with a panning shot capture function, and a panning shot image.

The interface 970 may include, for example, a high-definition multimedia interface (HDMI) 972, a universal serial bus (USB) 974, an optical interface 976, or a D-subminiature 978. The interface 970 may be included in, for example, a communication interface. Additionally or alternatively, the interface 970 may include, for example, a mobile high definition link (MHL) interface, an SD card/MMC interface, or an infrared data association (IrDA) standard interface.

The audio module 980 may convert a sound and an electric signal in dual directions. At least part of components of the audio module 980 may be included in, for example, an input and output interface. The audio module 980 may process sound information input or output through, for example, a speaker 982, a receiver 984, an earphone 986, or the microphone 988, and the like.

The camera module 991 may be a device which captures a still image and a moving image. According to an embodiment, the camera module 991 may include one or more image sensors (not shown) (e.g., a front sensor or a rear sensor), a lens (not shown), an ISP (not shown), or a flash (not shown) (e.g., an LED or a xenon lamp).

The power management module 995 may manage, for example, power of the electronic device 901. According to an embodiment, though not shown, the power management module 995 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 996 and voltage, current, or temperature thereof while the battery 996 is charged. The battery 996 may include, for example, a rechargeable battery or a solar battery.

The indicator 997 may display a specific state of the electronic device 901 or part (e.g., the processor 910) thereof, for example, a booting state, a message state, or a charging state, and the like. The motor 998 may convert an electric signal into mechanical vibration and may generate vibration or a haptic effect, and the like. Though not shown, the electronic device 901 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   at least one lens;
   an image sensor;
   an optical image stabilization (OIS) module configured to move at least one of the image sensor or the at least one lens in relation to OIS; and
   an image processor electrically connected with the OIS module,
   wherein the image processor is configured to:
      detect subjects having a movement of a specified magnitude or more,
      output, on the display, at least one object corresponding to at least one subject moving at a specified speed or higher based on a preview image,
      select the at least one object as an object to which a panning shot capture function is to be applied in response to a user input,
      control movement of the at least one lens in a specified direction by using the OIS module, and
      obtain a panning shot image of a moving subject while moving the at least one lens.

2. The electronic device of claim 1, wherein the image processor is further configured to:
   detect an angular velocity of the subject by using an image of a first camera; and
   obtain the panning shot image based on a second camera configured to be moved by the OIS module,
   wherein the second camera has a longer focal length than the first camera.

3. The electronic device of claim 1, wherein the image processor is further configured to:
   detect a speed of the subject, and
   obtain a shutter speed by which a background of the subject has a specified percentage of image blur based on the speed of the subject.

4. The electronic device of claim 1, wherein the image processor is further configured to adjust at least one of sensitivity of image exposure, an F-number, or a shutter speed to adjust an image blur thickness of the panning shot image while maintaining an exposure of the panning shot image to be obtained at a specified level.

5. The electronic device of claim 4, wherein the image processor is further configured to:
   allow a sensitivity adjustment limit of the image exposure, and
   allow the sensitivity of the image exposure adjusted to correspond to the shutter speed not to exceed the sensitivity adjustment limit of the image exposure.

6. The electronic device of claim 4, wherein the image processor is further configured to:
   allow a diaphragm adjustment limit, and
   allow an F-number adjusted to correspond to the shutter speed not to exceed the diaphragm adjustment limit.

7. The electronic device of claim 1, wherein the OIS module includes:
   a first axial module configured to move the at least one lens in a first axial direction, and
   a second axial module configured to move the at least one lens in a second axial direction different from the first axial direction.

8. The electronic device of claim 7, wherein the image processor is further configured to drive at least one of the first axial module or the second axial module to move the at least one lens in a same direction as a direction of movement of the subject.

9. The electronic device of claim 1, further comprising:
   a sensor configured to generate a sensor signal according to a shake of the electronic device,
   wherein the image processor is further configured to adjust a speed of movement of the OIS module in relation to the obtaining of the panning shot image according to the sensor signal.

10. The electronic device of claim 8, further comprising:
    a sensor configured to generate a sensor signal according to a shake of the electronic device, wherein the image processor is further configured to move the OIS module in a direction corresponding to the direction of movement of the subject by applying the sensor signal and to move the OIS module at a speed of movement of an image that is obtained to be identical with the speed of movement of the subject.

11. The electronic device of claim 1,
wherein the OIS module includes a plurality of axial modules configured to move the at least one lens in different directions, and
wherein the image processor is further configured to:
  obtain the panning shot image by using an axial module corresponding to a direction of movement of the specified object, among the plurality of axial modules, and
  apply the remaining axial modules to OIS.

12. A method for obtaining a panning shot image, the method comprising:
  obtaining a preview image;
  detecting subjects having a movement of a specified magnitude or more based on the preview image obtained by an electronic device;
  outputting, on a display, at least one object corresponding to at least one subject moving at a specified speed or higher based on the preview image;
  selecting the at least one object as an object to which a panning shot capture function is to be applied in response to a user input; and
  obtaining a panning shot image.

13. The method of claim 12, further comprising:
  determining whether a subject having a movement of a specified magnitude or more exists in the preview image;
  outputting, on a display, a shutter button associated with taking the panning shot image in a case where the subject having the movement of the specified magnitude or more exists in the preview image; and
  omitting the outputting of the shutter button associated with taking the panning shot image on the display, or outputting a shutter button configured to indicate a deactivated state of a panning shot capture function in a case where the subject having the movement of the specified magnitude or more does not exist in the preview image.

14. The method of claim 12, further comprising:
  maintaining an exposure of the panning shot image to be obtained at a specified level and simultaneously adjusting at least one of a sensitivity of image exposure, an F-number, or a shutter speed such that an image blur thickness to be displayed on the panning shot image has a specified thickness.

15. The method of claim 12, further comprising:
  collecting a sensor signal according to a shake of the electronic device; and
  adjusting a speed of an optical image stabilization (OIS) module moving in relation to the capturing of the panning shot image according to the sensor signal.

16. The method of claim 15, wherein the adjusting of the speed includes:
  moving the OIS module at a same speed as a speed of movement of the at least one subject in a direction corresponding to the direction of movement of the at least one subject by applying the sensor signal.

17. The method of claim 12, wherein the obtaining of the panning shot image includes:
  obtaining the panning shot image by using an axial module moving in a same direction as the direction of movement of the at least one subject, among a plurality of axial modules included in the optical image stabilization (OIS) module; and
  compensating an image sensor according to OIS by using remaining axial modules.

* * * * *